US006813842B2

United States Patent
Wang

(10) Patent No.: US 6,813,842 B2
(45) Date of Patent: Nov. 9, 2004

(54) FILLER GAUGE WITH FLEXIBLE MEASUREMENT

(75) Inventor: Wen-Cheng Wang, Taoyuan (TW)

(73) Assignee: Sun Yieh Industrial Co., Ltd., Taoyuan (TW)

( * ) Notice: Subject to any disclaimer, the term of this patent is extended or adjusted under 35 U.S.C. 154(b) by 0 days.

(21) Appl. No.: 10/412,342

(22) Filed: Apr. 14, 2003

(65) Prior Publication Data

US 2004/0200084 A1 Oct. 14, 2004

(51) Int. Cl.[7] .................................................. G01B 3/50
(52) U.S. Cl. ..................... 33/501.45; 33/471; 33/534; 33/531; 33/544.4
(58) Field of Search ...................... 33/471, 534, 501.08, 33/501.09, 501.4, 501.45, 832, 833, 483, 493, 494, 562, 563, 531, 544.4

(56) References Cited

U.S. PATENT DOCUMENTS

| 987,703 | A | * | 3/1911 | Curtin | 33/562 |
| 1,465,920 | A | * | 8/1923 | Edgar | 33/562 |
| 1,524,474 | A | * | 1/1925 | Buck | 33/562 |
| 1,661,701 | A | * | 3/1928 | Michler | 33/562 |
| 3,639,988 | A | * | 2/1972 | Impastalo | 33/11 |
| 5,471,757 | A | * | 12/1995 | McDonald | 33/501.45 |
| 5,665,973 | A | * | 9/1997 | Christenson | 250/484.2 |
| 6,279,241 | B1 | * | 8/2001 | Chen | 33/501.45 |

* cited by examiner

*Primary Examiner*—Diego Gutierrez
*Assistant Examiner*—Amy R. Cohen
(74) *Attorney, Agent, or Firm*—Birch, Stewart, Kolasch & Birch, LLP

(57) ABSTRACT

A filler gauge with flexible measurement is disclosed in the invention. The invention provides a filler gauge that is easy to be manufactured and able to lower cost as well as increase scope of measurement. In addition, each single unit of the filler gauge is made of plastic material that is flexible, bendable, and able to be trimmed so that various objects to be measured can be measured by suitable single units. Moreover, a ruler area and an angle-measuring area are further provided on each single unit so that a filler gauge capable of doing thickness, depth, and angle measurements is completed.

13 Claims, 4 Drawing Sheets

FILLER GAUGE WITH FLEXIBLE MEASUREMENT

FIELD OF THE INVENTION

The invention relates to a filler gauge with flexible measurement and, more particularly, to a filler gauge that performs thickness measurement for an object to be measured.

BACKGROUND OF THE INVENTION

Among all kinds of measuring tools such as block gauge, internal gauge, radius gauge, passimeter, filler gauge, height gauge, hardness gauge, leveling block, micrometer, and so on that are commonly used in electronic products or mechanical products, filler gauge is widely used in electronic components because of its small volume and capability of precision control such as measuring thickness of assembly and doing gap adjustment. The conventional filler gauges are composed of tens of metal sheets with different thickness and thickness dimensions (e.g. inch or mm) marked on them. However, when in use, a conventional filler gauge always encounters some irresolvable problems since the gauge is made of metal materials. To illustrate the problems, a bus slot that is assembled to a motherboard will be regarded as an object to be measured in order to illustrate the encountered problems.

1. If an object to be measured is a hard material and a lead angle is formed in the measured area of the object due to a shift, then the filler gauge cannot enter the object in parallel. Therefore, despite that the metal sheets are bendable thin metal sheets or unbendable thicker ones, they will rub the object to be measured and cause damage to the measured object when the metal sheets enter the area for measurement. Besides, if the measured object contains electronic lines or has the same metal materials as the metal sheets, then static or radiation interference will be resulted in because the filler gauge is made of metal sheets. Owing to that, the measured object might generate second-time defects, and such problem can really bother a user.

2. If the size of entrance for measuring an object is smaller than that of the measuring terminal of the filler gauge, the measuring terminal of the metal sheet in use has to be trimmed smaller. However, because the metal sheet is not easy to be trimmed, a prick will be formed at the place being trimmed, and the prick will damage the measured object.

3. In addition to thickness, the other dimensions required being measured usually also include depth or lead angle of the object's perimeter, etc. However, a conventional filler gauge only has a single function of measuring thickness. If the other kinds of measurement are required, other tools such as the above-mentioned tools will have to be applied, but changing tools can be very inconvenient to a user.

4. After a period of time of use, the thickness display area of a metal sheet may become hard to be read because the area will be abraded, and the abrasion may be irritating to a user.

SUMMARY OF THE INVENTION

To solve the foregoing problems, the invention provides a filler gauge that each single unit of the gauge is made of plastic material, which is flexible, bendable, and allowed to be trimmed. The following descriptions are to illustrate the functions of the invention that can solve the problems of conventional filler gauge.

1. A single unit of filler gauge that is made of plastic material does not have conductivity; therefore, no static or radiation interference will be brought in to the object to be measured.

2. A single unit of filler gauge can apply its flexibility and bend appropriately in accordance with the angle it enters for measuring to prevent the measured object from abrasion so that second time defects can be avoided.

3. The measuring terminal of the single unit can be trimmed according to the size of entrance for measurement. Therefore, even though a prick may be generated, the object to be measured will not be damaged by the prick because the measuring terminal is made of soft plastic.

4. A ruler area and an angle-measuring area are provided on each single unit so that the filler gauge is capable of measuring thickness, depth, and angle of the object altogether. Therefore, the user can save time to change tools for measurements other than thickness measurement because the filler gauge of the invention can handle other measurements as well. Hence, the economic value of the filler gauge can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

The objects and technical contents of the invention will be better understood through the description of the following embodiments with reference to the drawings.

Figure 1:
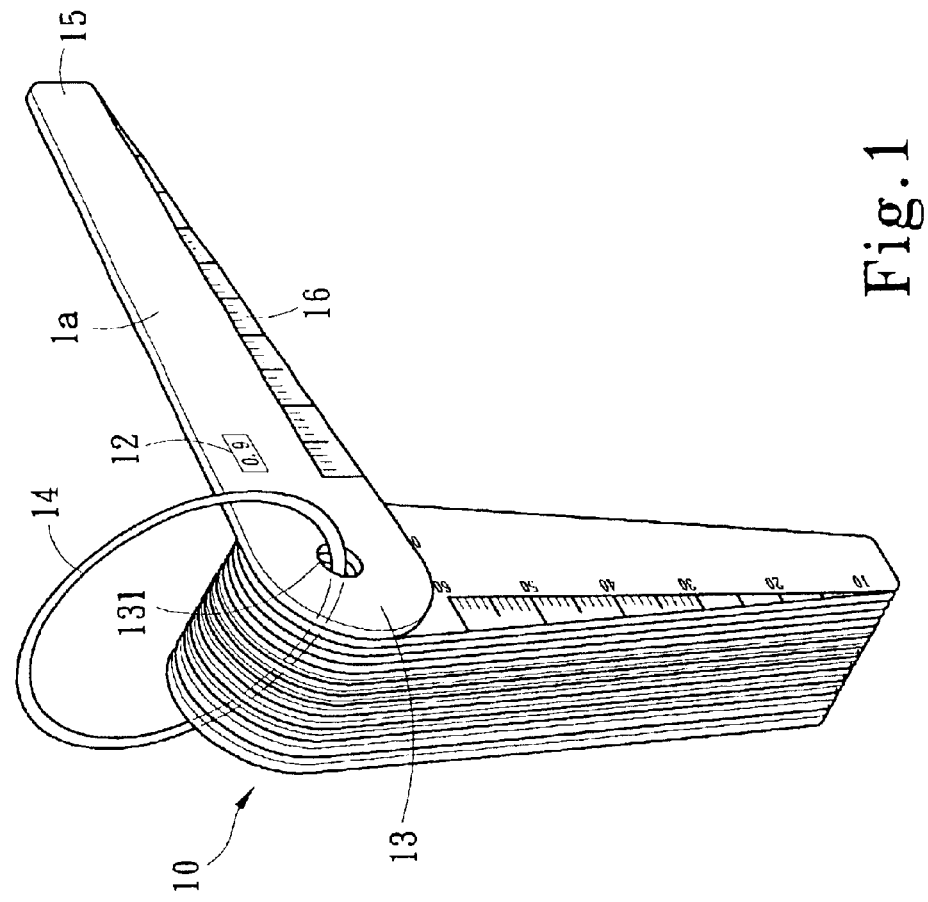
FIG. 1 is a perspective schematic diagram showing an overall external view of the filler gauge of the invention.
Figure 2:
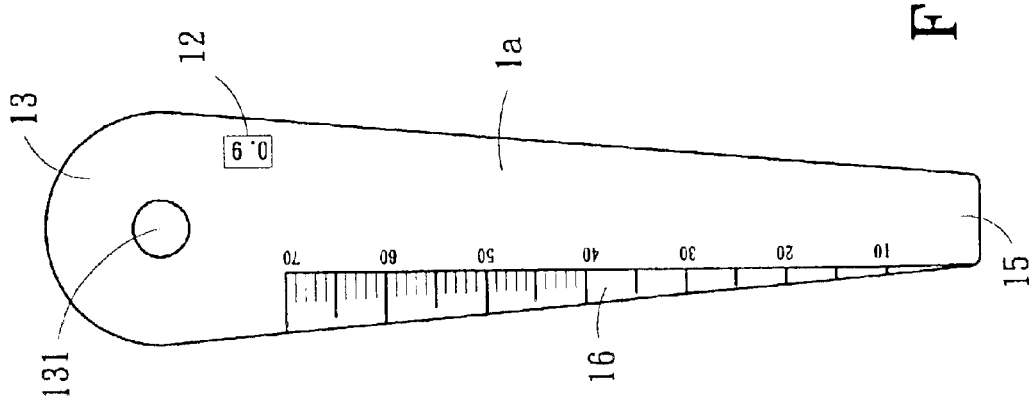
FIG. 2 is a schematic diagram showing a single unit of filler gauge of the invention.
Figure 3:
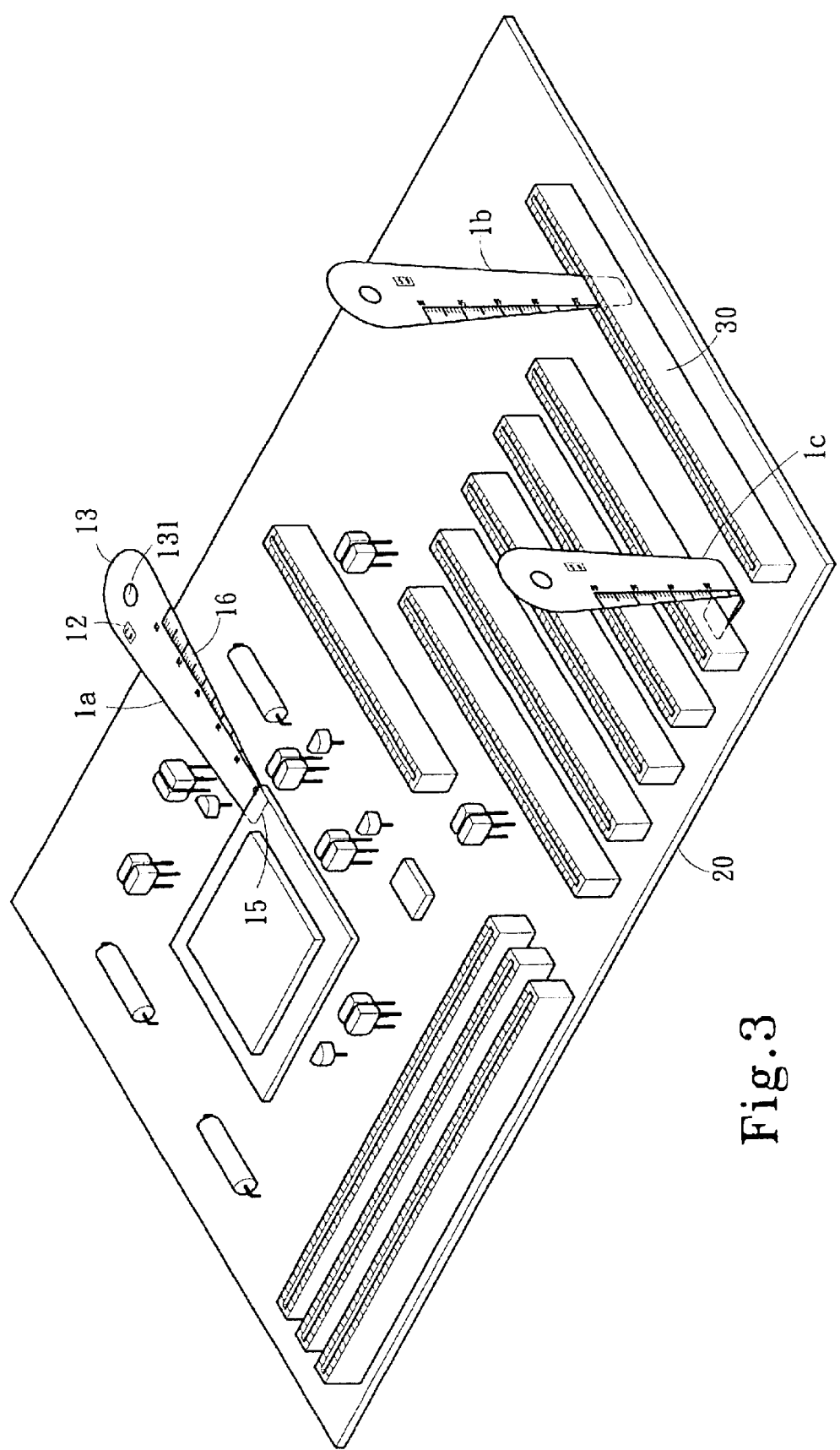
FIG. 3 is a schematic diagram showing that thickness and depth measurements are performed in the invention.

FIG. 1 is a perspective schematic diagram showing an overall view of the filler gauge 10 and an external view of the single unit 1 of the invention. Referring to FIG. 1, a filler gauge 10 can define a specification for each single unit 1a according to the thickness of the object to be measured, and a thickness display area 12 also can be defined on the single unit 1a. The thickness display area 12 is formed through sticking a label marked with desired thickness dimension on the single unit 1a or through printing thickness dimension on the single unit 1a. Besides, each single unit 1a of the filler gauge 10 is made of flexible plastic material. A uniting end 13 is provided at one end of the single unit 1a, and a measuring terminal 15 is formed starting from the uniting end 13 to its opposite direction in a diminishing manner. In addition, a positioning portion 131 is provided so that a uniting piece 14 is able to unite a plurality of single unit 1a through the positioning portion 131 to form a whole filler gauge 10. Moreover, a ruler area 16 is provided on the single unit 1a for measuring depth or length of the object and is formed through printing that is starting from the end of the measuring terminal 15 to the uniting end 13. FIG. 3 is a schematic diagram showing that thickness and depth measurements are performed in the invention. Referring to FIG. 3, the embodiment is taking a bus slot 30 of a motherboard 20 as an example for illustrating how the depth and thickness of assembly (or a gap) of the bus slot 30 is measured. The single unit 1a shown in FIG. 3 is for a thickness measurement, whereas the single unit 1b is for a depth measurement. The aspect of these two measurements is that the entrance of the object to be measured is parallel to the two single units 1a and 1b. Specifically, two appropriate single units 1a & 1b of the filler gauge 10 will be picked out by the user and then inserted into the object to be measured to measure the bus slot 30 of the motherboard 20. By doing so, the thickness or the gap size of the object can be obtained from the thickness display area 12 of each single unit 1a, whereas the depth of the bus slot 30 allowed to be inserted in can be obtained from the scale marked on the thickness display area 16 without taking other kinds of tool for measuring.

Also, the aspect of measurement on 1c is that if a shift has been made on the entrance of the object to be measured and therefore a lead angle is formed, or if it is impossible for the single unit 1c to make a parallel entry because other peripheral components has occupied all the needed space for entering, the measuring terminal 15 of the single unit 1c can then be properly bent and inserted into the object to be measured for measuring without any limitation since the single unit 1c is made of flexible plastic material.

Figure 4:
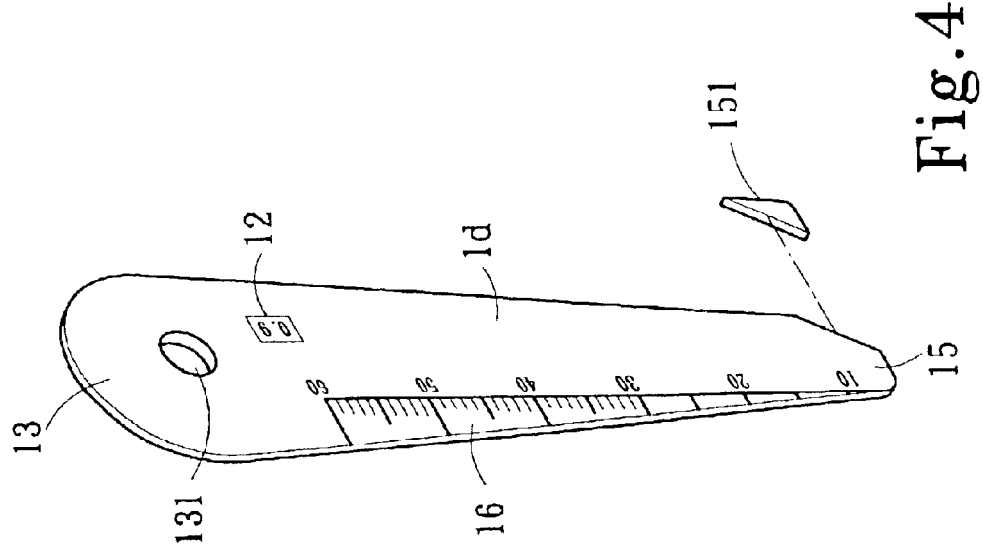
FIG. 4 is a schematic diagram showing that a single unit of the invention is trimmed.

Furthermore, the aspect of FIG. 4 is that even thought the entrance of the object to be measured may be smaller than the measuring terminal 15 of the single unit 1d, it is unnecessary to produce another filler gauge 10 with different specification. Instead, a discarded portion 151 can be cut off from the measuring terminal 15 of the single unit 1d by a cutting tool. Thus, the single unit 1d after cutting can be well adapted to the entrance of the object to be measured for measuring.

Figure 5:
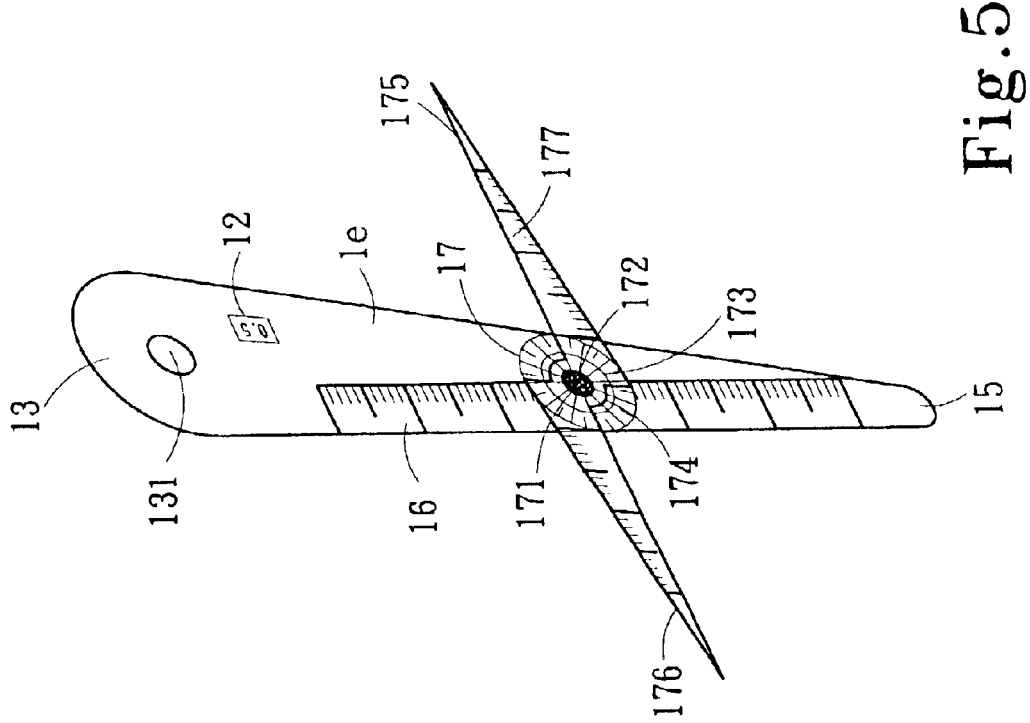
FIG. 5 is a perspective schematic diagram showing an external view of an angle-measuring element provided in the invention.
Figure 6:
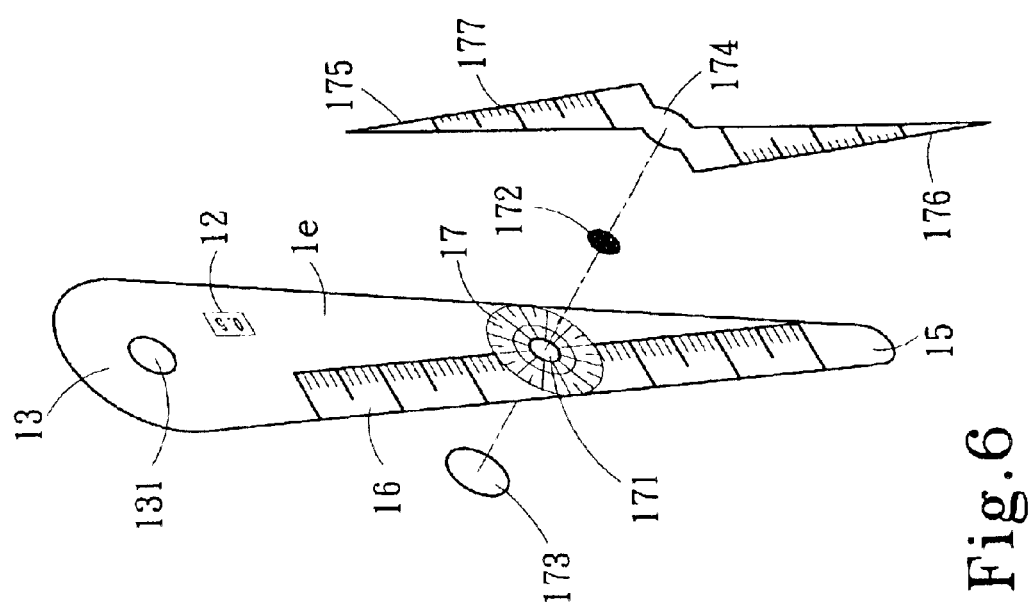
FIG. 6 is an exploded schematic diagram showing a perspective view of an angle-measuring element provided in the invention.

FIGS. 5 & 6 are schematic diagrams showing external view and exploded view respectively of an angle-measuring element of the invention. Referring to FIGS. 5 & 6, an angle-measuring area 17 is provided on the single unit 1e of the filler gauge 10, wherein an accommodating portion 171 is provided in the center of the angle-measuring area 17, whereas a pivot 172, a positioning element 173 assembled opposite to the pivot 172, and an angle-measuring element 174 are provided in the accommodating portion 171. Besides, two angle portions 175 & 176 are provided extending and protruding from the single unit 1e in opposite directions as well as corresponding to the scale of the angle-measuring area 17.

Figure 7:
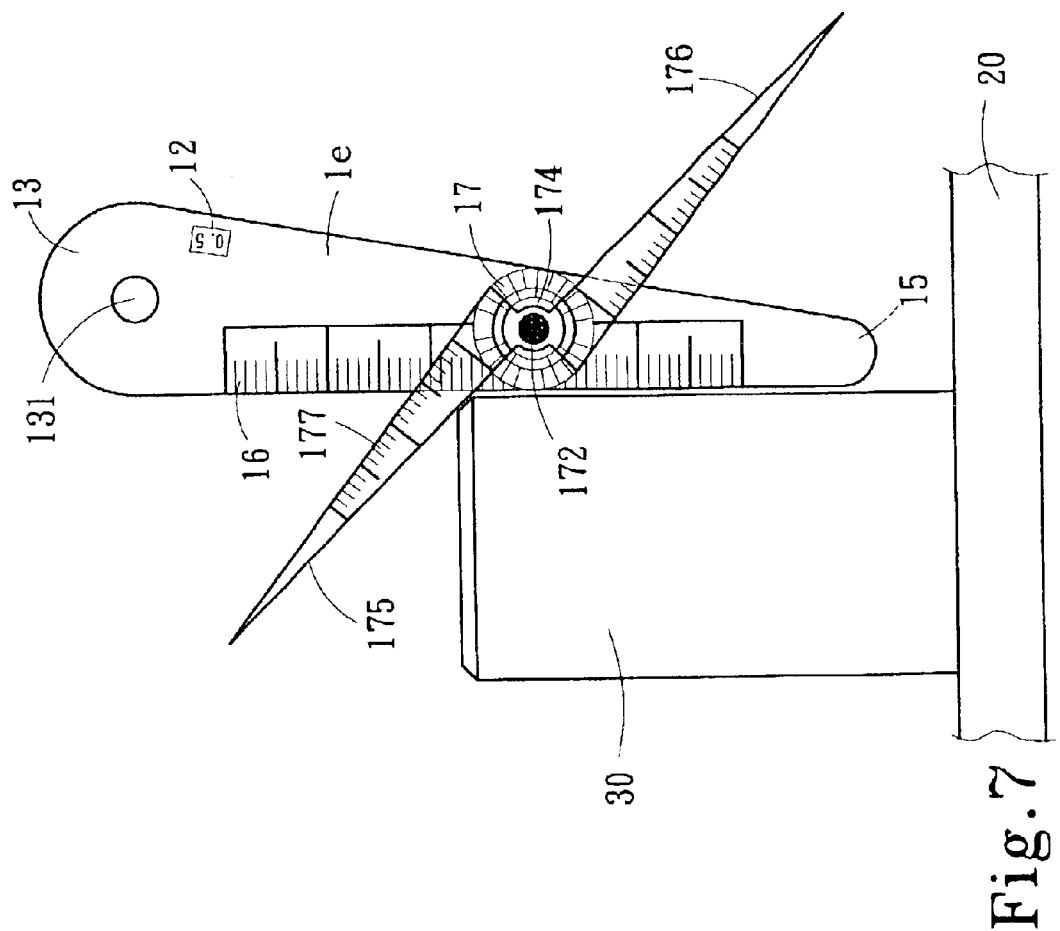
FIG. 7 is a schematic diagram showing that an angle measurement for a lead angle is performed in the invention.

FIG. 7 is a schematic diagram showing that an angle measurement for a lead angle is performed in the invention. Referring to FIG. 7, when a user is performing an angle measurement, the pivot 172 is used as a pivot point. Also, the angle-measuring element 174 can revolve freely and form an angle relative to the single unit 1e. Therefore, when any one of the angle portions 175 & 176 of the angle-measuring element 174 is used to measure angle for an object, the user can read the measured angle from the scale of the angle-measuring area 17. In addition, a ruler area 177 is provided on angle portions 175 & 176 for measuring depth or length of the object so that the user can use the ruler area in accordance with the measuring terminal 15 of single unit 1e conveniently. Moreover, when the angle-measuring element 174 is folded, it can be fully accommodated in the range of single unit 1e. Therefore, the angle-measuring element 174 is very convenient in portability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A filler gauge with flexible measurement having a plurality of single units, wherein a specification of each single unit is defined according to thickness of an object to be measured, and a thickness display area defined on the single unit, each single unit of the filler gauge is made of flexible plastic material, and one end of the single unit is defined as a uniting end, whereas the other end of it is defined as a measuring terminal, each of the single units having an angle-measuring area.

2. The filler gauge with flexible measurement as claimed in claim 1, wherein the measuring terminal is formed starting from the uniting end to its opposite direction in a diminishing manner.

3. The filler gauge with flexible measurement as claimed in claim 1, wherein a positioning portion is provided on the uniting end so that the plurality of single units are able to be united through the positioning portion to form a whole filler gauge.

4. The filler gauge with flexible measurement as claimed in claim 1, wherein the thickness display area of the single unit is formed through a label marked with thickness dimension.

5. The filler gauge with flexible measurement as claimed in claim 1, wherein a ruler area is provided on the single unit for measuring depth or length of the object to be measured.

6. The filler gauge with flexible measurement as claimed in claim 5, wherein the ruler area is formed through printing, starting from the end of the measuring terminal to the uniting end.

7. The filler gauge with flexible measurement as claimed in claim 1, wherein an accommodating portion is provided in the center of the angle-measuring area, whereas a pivot, a positioning element assembled opposite to the pivot, and an angle-measuring element are provided in the accommodating portion.

8. The filler gauge with flexible measurement as claimed in claim 7, wherein two angle portions are provided extending and protruding from the single unit in opposite directions as well as corresponding to the scale of angle-measuring area of each single unit.

9. The filler gauge with flexible measurement as claimed in claim 8, wherein a ruler area is provided on angle portions for measuring depth or length of the object.

10. A filler gauge with flexible measurement having a plurality of single units, wherein a specification of each single unit is defined according to thickness of an object to be measured, and a thickness display area defined on the single unit, an angle-measuring area is provide on each single unit of the filler gauge, wherein an accommodating portion is provided in the center of the angle-measuring area, a pivot, a positioning element assembled opposite to the pivot, and angle-measuring elements are provided in the accommodating portion; by the angle-measuring element, the angle between the angle-measuring element and the object to be measured can be measured through a corresponding scale of angle-measuring area of each single unit.

11. The filler gauge with flexible measurement as claimed in claim 10, wherein a ruler area is provided on the single unit for measuring depth or length of the object to be measured.

12. The filler gauge with flexible measurement as claimed in claim 10, wherein two angle portions are provided extending and protruding from the single unit in opposite directions and corresponding to the scale of angle-measuring area of each single unit.

13. The filler gauge with flexible measurement as claimed in claim 10, wherein a ruler area is provided on angle portions for measuring depth or length of the object.

* * * * *